G. C. DAVISON.
FIELD AND SIEGE ARTILLERY.
APPLICATION FILED DEC. 9, 1915.

1,215,255.

Patented Feb. 6, 1917.
6 SHEETS—SHEET 1.

G. C. DAVISON.
FIELD AND SIEGE ARTILLERY.
APPLICATION FILED DEC. 9, 1915.

1,215,255.

Patented Feb. 6, 1917.
6 SHEETS—SHEET 4.

Witness
Edwin J. Beller.

Inventor
G. C. Davison,
by Wilkinson, Giusta,
& MacKay
Attorneys.

G. C. DAVISON.
FIELD AND SIEGE ARTILLERY.
APPLICATION FILED DEC. 9, 1915.
1,215,255.
Patented Feb. 6, 1917.
6 SHEETS—SHEET 5.
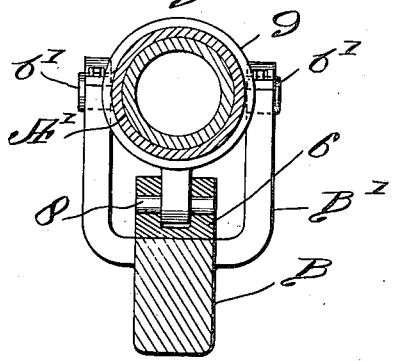
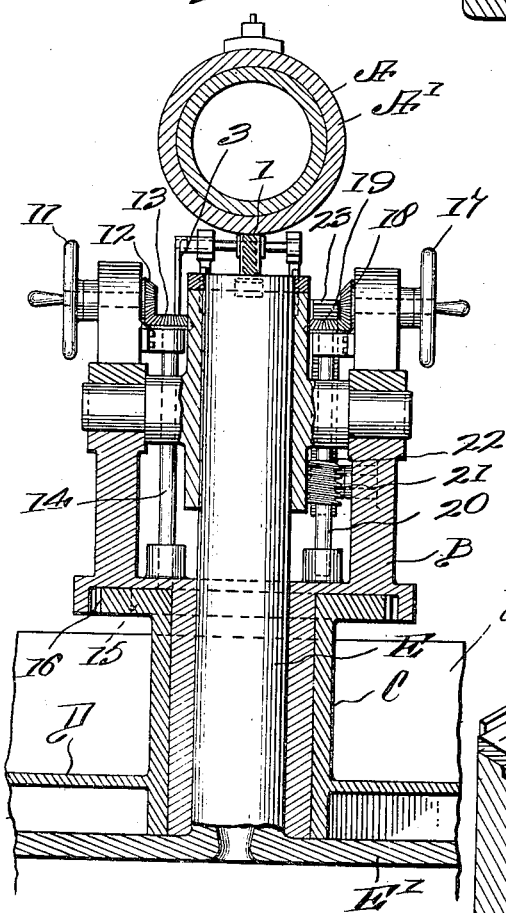
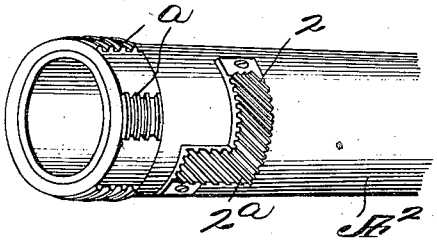
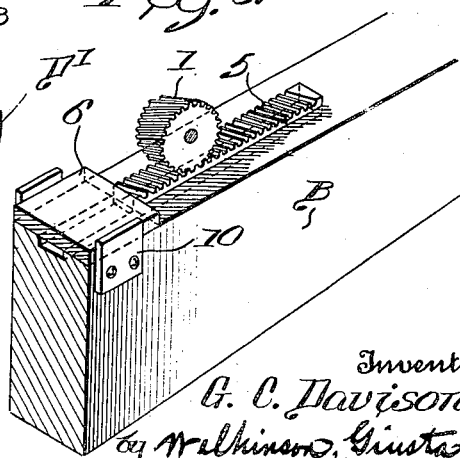
Witness
Edwin J. Beller.
Inventor
G. C. Davison,
by Wilkinson, Giusta
& Mackaye
Attorneys.

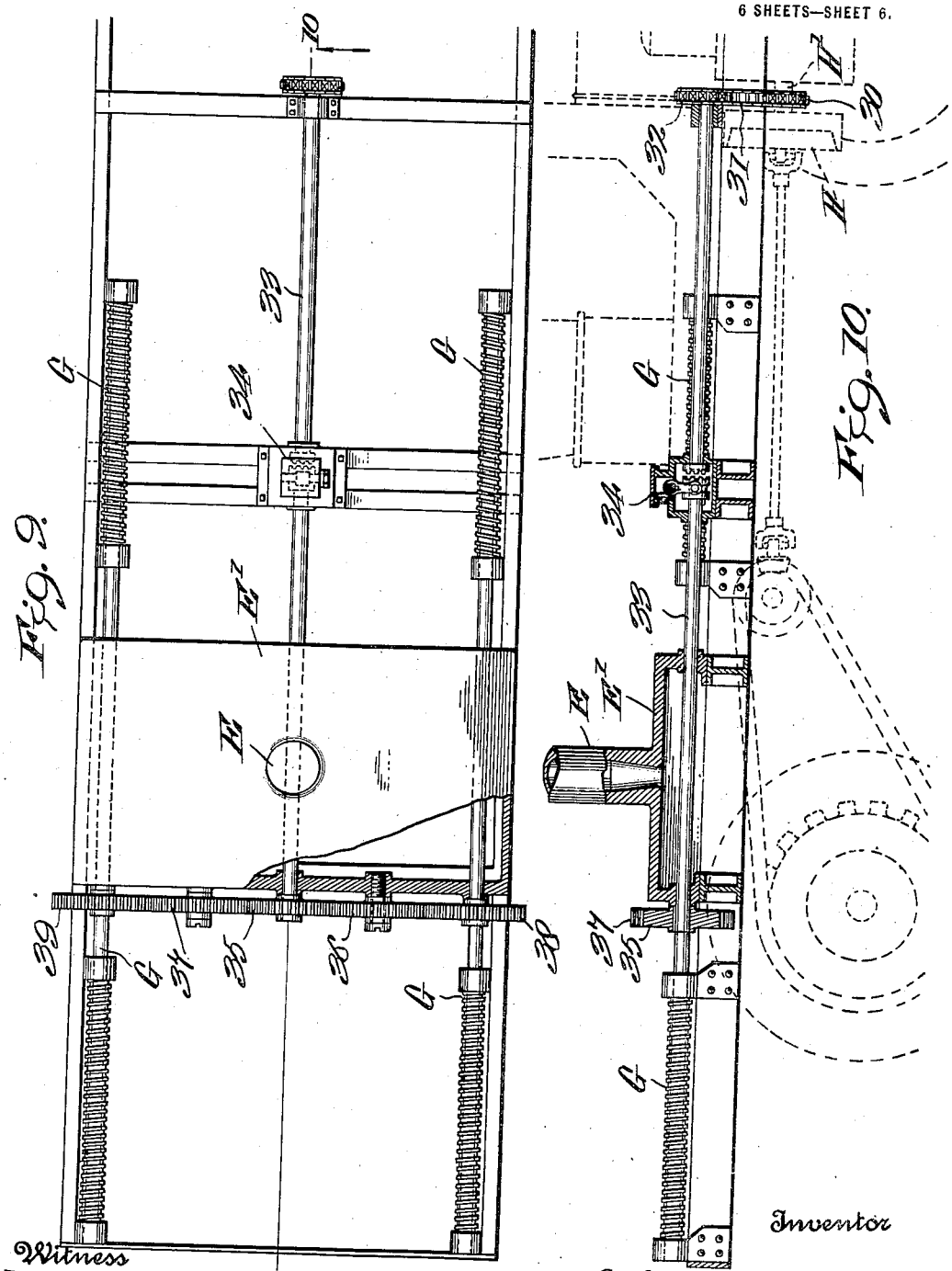

UNITED STATES PATENT OFFICE.

GREGORY C. DAVISON, OF GROTON, CONNECTICUT.

FIELD AND SIEGE ARTILLERY.

1,215,255.   Specification of Letters Patent.   Patented Feb. 6, 1917.

Application filed December 9, 1915. Serial No. 65,970.

*To all whom it may concern:*

Be it known that I, GREGORY C. DAVISON, a citizen of the United States, residing at Groton, in the county of New London and State of Connecticut, have invented certain new and useful Improvements in Field and Siege Artillery; and I do hereby declare the following to be a full, clear, and exact description of the invention, such as will enable others skilled in the art to which it appertains to make and use the same.

My invention relates to improvements in field and siege artillery, and it is intended to provide a comparatively large gun mounted upon a comparatively small and light movable gun platform, and arranged so that the gun platform may be quickly shifted as by its own motive power from one place to another, and the gun may be fired therefrom at any desired angle of azimuth, and within wide limits in elevation, without moving the gun from the movable platform and without special preparations made for supporting the gun mount and platform on the ground.

By the use of a non-recoil rifle of the character hereinafter described, a high power gun of large caliber may be mounted upon an ordinary service motor truck and may be fired from said truck in any direction in azimuth and at the desired elevation. It can be readily rushed to any advantageous position, fired therefrom as long as desired, and then may be quickly shifted to another place when the enemy spots its position. This gives the piece a long radius of action and quick transportation between widely separated points.

The shock of the recoil being avoided, the pressure upon the gun platform is not affected by the direction of the line of fire of the projectile with regard to the gun platform, whether said line of fire be lengthwise of the gun platform, or transverse thereto, or whether it be at a high vertical angle or level. Thus at high angles, there is no more downward thrust on the gun platform than there is when firing at point blank range.

There being no apparatus required to ease the shock of recoil, all heavy recoil mechanism is eliminated, and by making the gun body of a high grade alloyed steel the increased weight due to the length of the gun is less than that of the heavy breech end and breech mechanism, with recoil mechanism, of the ordinary gun mounted on a recoil mount.

My invention will be more clearly understood by reference to the accompanying drawings, in which similar parts are indicated by similar reference symbols throughout the several views:—

Fig. 5 shows a section along the line 5—5 of Fig. 2, and looking in the direction of the arrows, parts being shown on a larger scale than in Fig. 2, and parts being shown in elevation;

Fig. 6 shows a section along the line 6—6 of Fig. 2, and looking in the direction of the arrows;

Fig. 7 is a detail showing the forward end of the rear member of the gun body, and the L-shaped rack for turning the same and moving it longitudinally;

Fig. 8 is a perspective view showing the breech operating worm, and the rack for controlling the tilting of the forward member of the gun body;

Fig. 9 is a plan view, parts being broken away, and showing the means for raising and lowering the gun relative to the platform; and Fig. 10 is a section along the line 10—10 of Fig. 9, looking in the direction of the arrows, parts being shown in elevation.

Figure 2:
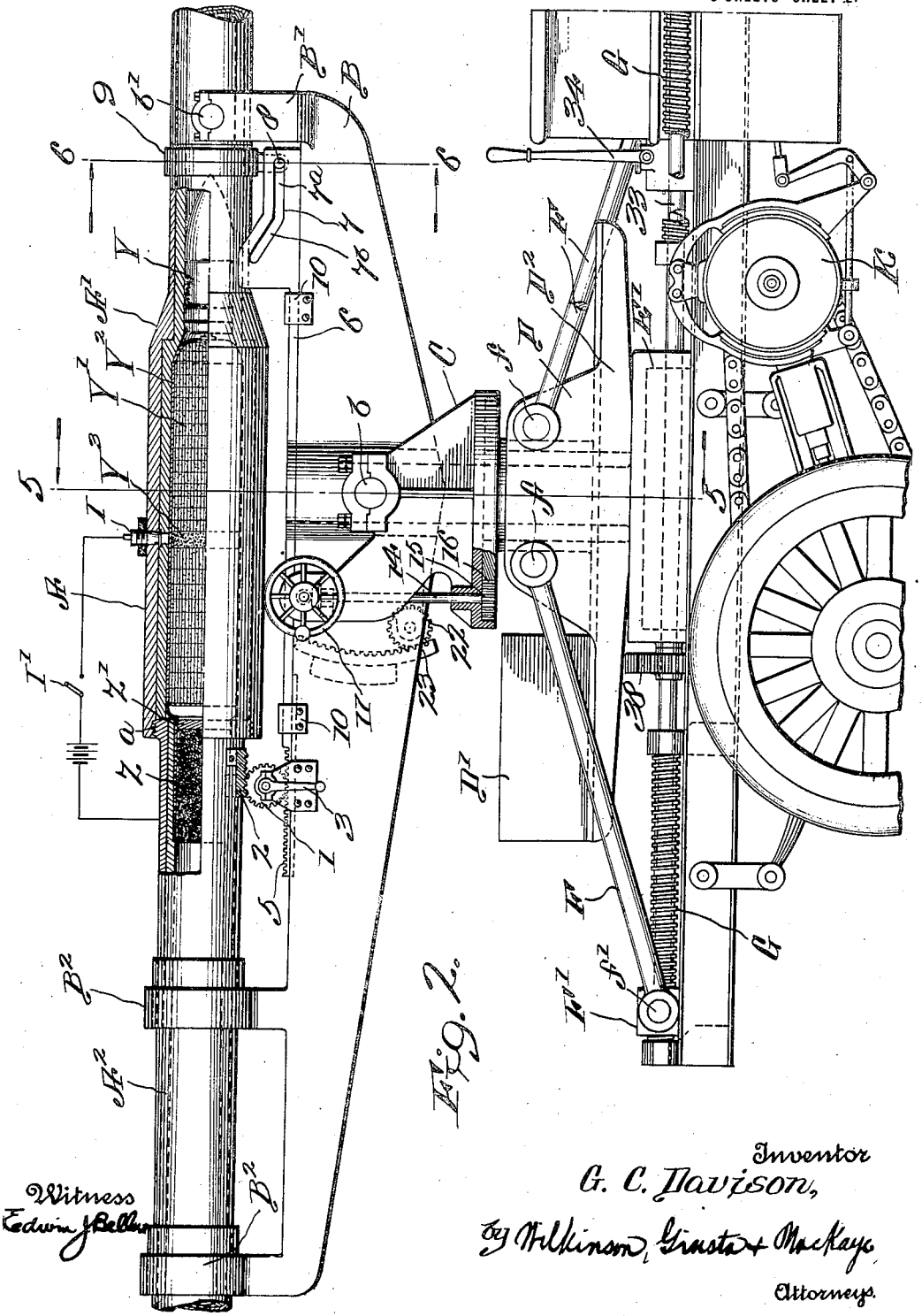
Fig. 2 shows a similar view, on a larger scale, of the central portions of the gun and mount, parts being broken away, and the gun being in the lowered position in which it is ordinarily transported.
Figure 3:
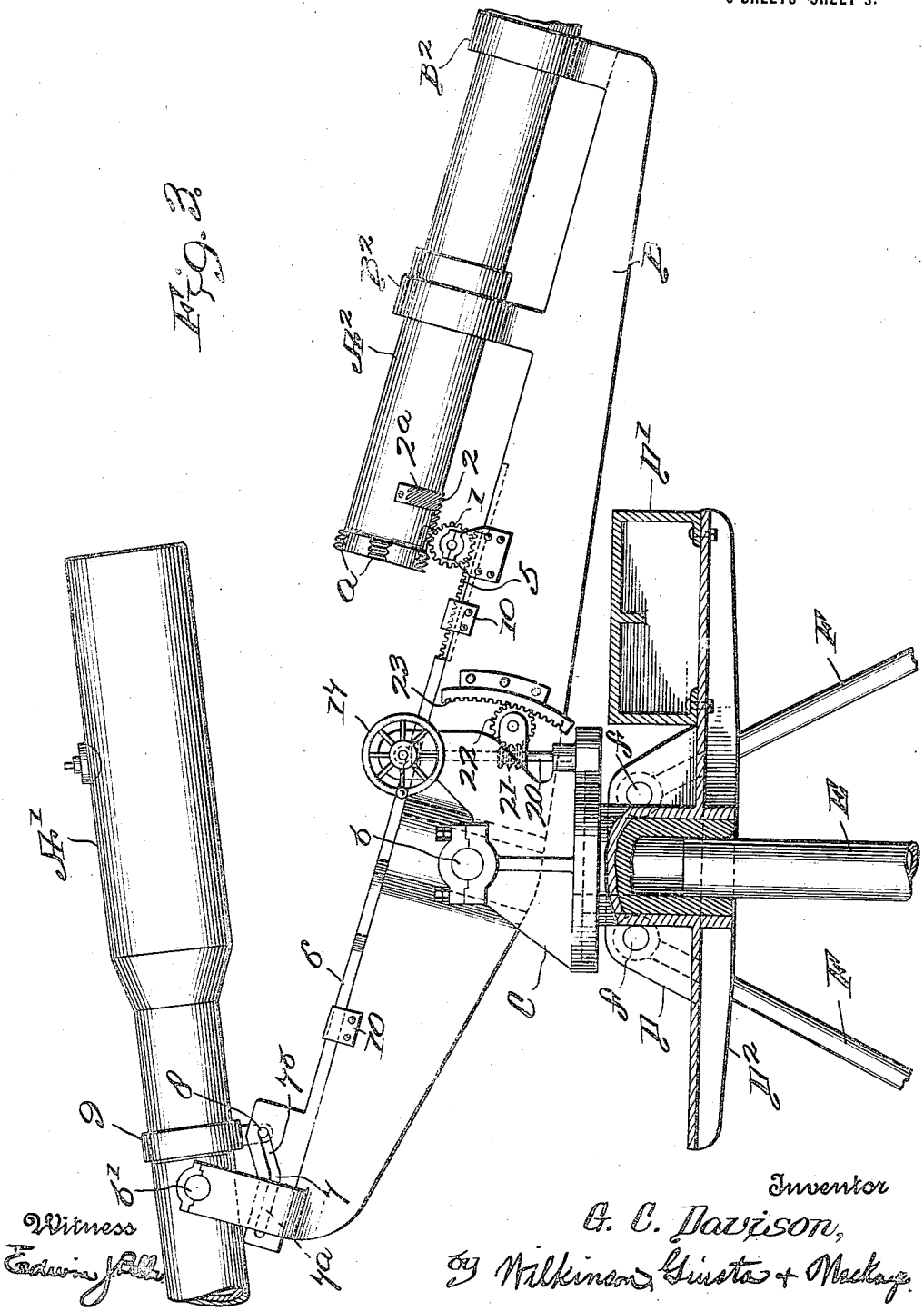
Fig. 3 shows the opposite side of the gun from Fig. 2, but with the breech open and the parts in the position for loading.

The gun body is composed of a forward barrel A' and a rear barrel A², the two barrels being connected together by the slotted screw arrangement *a*, shown in Figs 2, 3 and 7, so that when the two barrels are coupled together they form a continuous gun tube open at both ends, as shown in Fig. 2.

The forward barrel A' of the gun body is trunnioned to the yoke B' of the trunnion beam B, and the rear barrel A² is free to slide and to turn in the ring-shaped guides B² carried by the rear end of the trunnion beam. This trunnion beam B is trunnioned, as at $b$, to the top carriage C, which is mounted on the operating carriage D, and can be turned in azimuth thereon, as will be hereinafter more fully described.

The forward barrel A' of the gun body is trunnioned near its breech, as at $b'$, so that there is a muzzle preponderance which will normally tend to tilt the muzzle of the gun downward and the breech upward, as shown in Fig. 3; but when the projectile and propelling charge are placed in the chamber of the gun, this muzzle preponderance is converted into a breech preponderance, and the rear or breech end of the front barrel of the gun body tends to swing down when the gun is loaded, so that the slotted screw threads on the two barrels may register.

Figure 1:
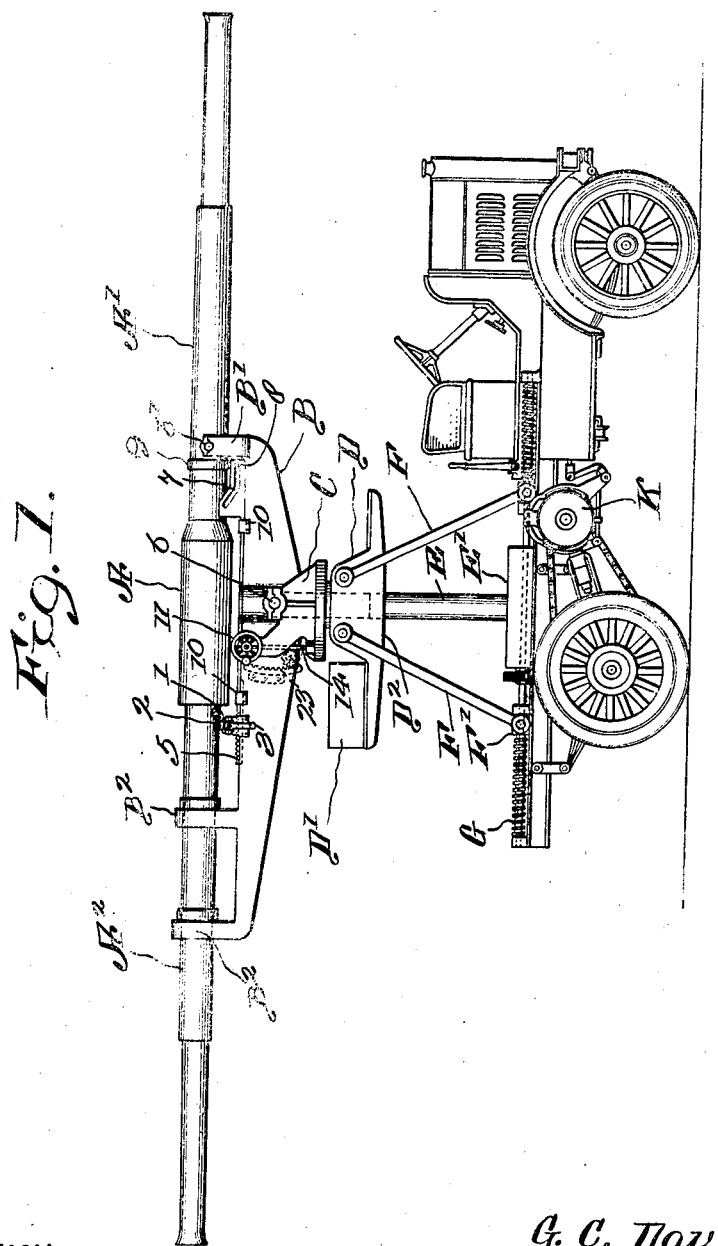
Figure 1 is a side elevation of the gun and mount, the gun being in the raised position and ready for firing, and being shown level.

By having the breech end of the forward barrel A' tilt upward, as shown in Fig. 3, it is in convenient position for inserting the projectile Y and the propelling charge Y', which latter is preferably not fixed ammunition, but contained in a bag Y²; and for convenience in loading I provide a loading platform D', see Figs. 1, 2 and 3. When the forward barrel A' is tilted up, as shown in Fig. 3, the forward portion of the rear barrel A² is in position for conveniently inserting the counter-weight Z.

In order to couple together and uncouple the two barrels A' and A² of the gun body, I provide suitable breech mechanism such as the worm 1, meshing in the L-shaped rack 2, which worm is turned in any convenient way, as by a hand crank 3. The first effect of turning this hand crank, when the parts are locked together, will be to rotate the barrel A² to the unlocked position, then the worm engaging in the threads 2ª will move the barrel A² rearward, out of engagement with the breech of the barrel member A'.

The worm 1 also meshes with a worm rack 5, which slides on the trunnion beam B, and is attached to the cam plate 6, having the cam groove 7, engaging the pin 8 on the band 9, fast to the front barrel A'. This cam plate 6 slides in suitable guides 10, carried by the trunnion beam B.

During the first part of the operation of opening the breech, the worm 1 will cause the rack 5 to push the cam plate forward, causing the pin 8 to slide, first, lengthwise in the forward portion 7ª of the slot 7 and then to ride up into the rear portion 7ᵇ of said slot 7, as shown in Fig. 3. Of course, before the pin slides up into the rear portion 7ᵇ of the slot 7, the rear gun barrel has to become wholly disengaged from the breech of the front gun barrel, which tends to tilt up, due to its muzzle preponderance, and it is also cammed up by the slot 7ᵇ. It will be held in this position until the gun is lowered, and then the breech mechanism is turned in the reverse order, camming the rear end of the breech of the forward gun barrel down until the breech registers with the interrupted screw-threads on the rear gun barrel. Any further movement of the hand crank 3 will tend to push the rear barrel into the breech of the front gun barrel, and will then turn the rear gun barrel, locking the parts together in the position shown in Fig. 2.

Figure 4:
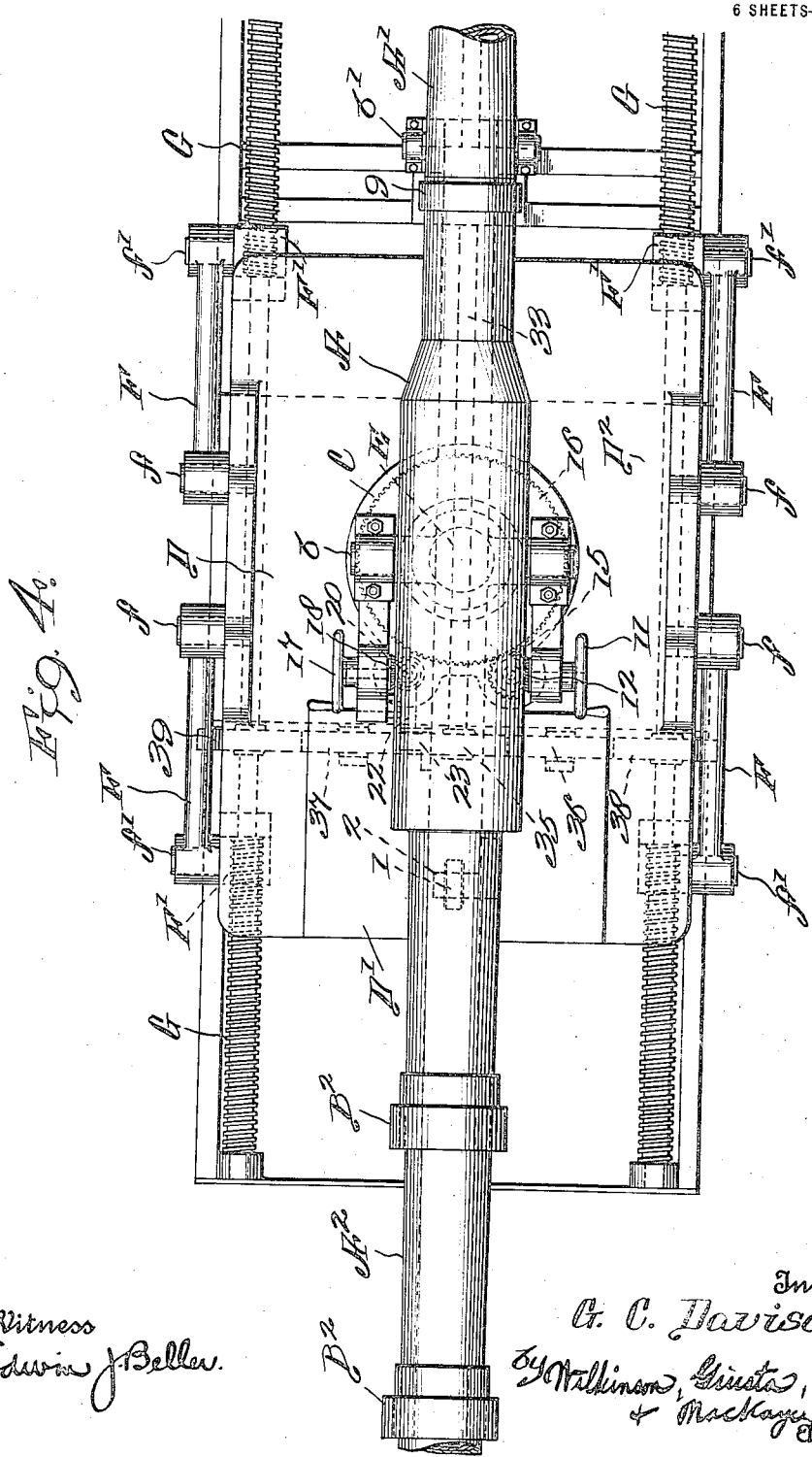
Fig. 4 is a plan view of the parts shown in Fig. 2.

The upper carriage C is mounted to turn on the lower or operating carriage D, and any suitable training gear, such as the hand wheel 11 turning the beveled gear 12, may be provided (see Figs. 2 and 5). This gear turns the beveled pinion 13 which turns the shaft 14, and the pinion 15 meshing with a circular rack 16 on the operating carriage, see Figs. 2 and 4. In this way the upper carriage C, and with it the gun, may be turned through 360° in azimuth, and the gun may be fired in any direction in azimuth.

In order to provide for elevating and depressing the gun, I provide suitable elevating gear, shown in detail in Figs. 3 and 5, in which 17 indicates a hand wheel turning the beveled gear 18, meshing with the beveled gear 19 on the shaft 20, which shaft carries a worm 21, meshing with a worm wheel 22, engaging the worm rack 23 fast to the trunnion beam B. Thus, the gun may be elevated or depressed within limits determined, of course, by the length of the rear gun barrel, which would strike the ground when the elevation exceeds a certain amount.

When the gun is in the position for transport, the shoe D² of the operating carriage D is lowered on the cylindrical stem E (see Fig. 1) and rests on the base E', secured to or integral with the main frame of the automobile, which constitutes the gun platform, the parts being then in the position shown in Fig. 2.

When it is intended to fire the gun, the operating carriage is preferably raised to the position shown in Fig. 1, which not only increases the height of the gun body or gun platform, and thereby enables it to fire over earth works or the like, but it also, by giving a greater height to the gun center, enables a higher angle of fire to be secured. This raising and lowering of the operating carriage D is effected by means of the toggle bars F, pivoted at their upper ends at $f$ to the operating carriage, and pivoted at their lower ends, as at $f'$, to the nuts F' mounted on the screws G. These screws G are right and left-handed at opposite ends of the machine, respectively, so that a rotation in one direction will draw the nuts F' toward each other, and turning in the opposite direction will spread the nuts apart, and will thus cause the toggle bars to raise or lower the operating carriage, as the case may be.

These screws are preferably driven from the engine of the automobile, by suitable clutch mechanism as shown in Figs. 2, 9 and 10, in which H represents the fly wheel of the engine (see Fig. 10) mounted on the main engine shaft H', which carries a sprocket wheel 30, driving a sprocket chain 31, which drives a sprocket wheel 32 mounted on a central shaft 33, controlled by the clutch mechanism 34. When this clutch is in operation it drives the gear wheel 35, meshing with the idlers 36 and 37, which mesh with the pinions 38 and 39 on the screws G.

Any suitable reversing arrangement, not shown, may be included in the figures, but I do not mean to limit my invention to any particular form or shape of clutch mechanism; but for the sake of clearness in the drawings I have shown simply a straightaway drive.

The automobile is driven in the usual way, and I do not make any special claim to the construction of the automobile body or chassis, or the driving or braking gear for the same, suitable braking mechanism being shown at K in Figs. 1 and 2.

By lowering the gun body when in transport, the center of gravity of the system will be lowered, and the automobile may be more conveniently run over laterally inclined roads, without tending to tilt over, and it also may be driven at a rapid rate around sharp curves without tending to tilt over; but when the gun is in position for firing it is preferable to have it raised as high as practicable, there being no tendency of the recoil to tilt the gun platform over laterally, or to cause any great strain on the wheels or supporting parts of the chassis. But it will be evident that for certain types of artillery, the gun may be maintained at a permanent height above the chassis of the auto-truck, thus avoiding the necessity of providing the special parts for raising and lowering the operating gun carriage and the parts supported thereby.

By having the forward barrel tilt up, as shown, not only is it more convenient to load the gun, but the insertion of the projectile and propelling charge will tend to normally lower the forward gun barrel to the proper position to register with the rear gun barrel in the act of closing the breech; thus no special hand power is required to accomplish this desirable result.

The drawings show the gun barrel of preferably a five-inch caliber, but the size of the gun may be increased or decreased at will, as may also the strength of the main frame or chassis, of the automobile, which forms the gun platform.

In order to fire the gun properly, I provide a suitable firing mechanism such as the electric firing mechanism shown diagrammatically in Fig. 2, in which I represents an electric primer and I' is a switch or trigger adapted to close an electric circuit and fire the ignition charge $Y^3$, which is preferably placed in the bag $Y^2$ between the two sections of the propelling charge, as shown in Fig. 2.

When the gun is fired, the projectile flies forward through the front barrel with a velocity depending upon the pressure of the powder gases, while the counterweight Z flies backward through the rear barrel and strikes the ground in rear of the gun. This counterweight is preferably made of a casing containing a mass of bird shot, sand, or other heavy material, provided with a wad Z' at the front end thereof, as shown in Fig. 2. This counterweight is intended to break up and become dissipated a few yards from the gun, after the piece has been fired.

Normally the weight of the counterweight will equal that of the projectile. But by making the counterweight heavier than the projectile, the velocity of the projectile may be proportionally increased according to the well known formula $Mv = M'v'$, where $M$=the mass, and $v$=the velocity of the projectile; and $M'$=the mass, and $v'$=the velocity of the counterweight. It is understood that the elements of friction of the projectile in the bore and of the counterweight in the rear gun barrel are substantially equal.

Where the gun is intended to use a heavier counterweight than projectile, the rear barrel should, of course, be made shorter than the front barrel.

It will be obvious that various modifications might be made in the herein described apparatus, and in the construction, combination and arrangement of parts which could be used without departing from the spirit of my invention.

Having thus described my invention what I claim and desire to secure by Letters Patent of the United States is:—

1. In field or siege artillery, the combination with a gun support, of a non-recoil gun mounted thereon, composed of a hollow tube open at both ends and comprising a front barrel and a rear barrel with interrupted screw threads connecting the two, trunnions on the front gun barrel, and trunnion bearings therefor on the gun support, and guides on said gun support engaging the rear gun barrel, said guides permitting the rear gun barrel to slide longitudinally and turn axially therein, with means for rotating said rear gun barrel to unlock the same, and for moving the same axially to clear the breech of the forward gun barrel.

2. In field or siege artillery, the combination with a gun support, of a non-recoil gun mounted thereon, composed of a hollow tube open at both ends and comprising a front barrel and a rear barrel with interrupted screw threads connecting the two, trunnions on the front gun barrel, and trunnion bearings therefor on the gun support, and guides on said gun support engaging the rear gun barrel, said guides permitting the rear gun barrel to slide longitudinally and turn axially therein, with means for rotating said rear gun barrel to unlock the same, and for moving the same axially to clear the breech of the forward gun barrel, said means comprising an L-shaped spiral rack secured to the exterior of the rear gun barrel, a worm meshing in said rack, and means for rotating said worm.

3. In field or siege artillery, the combination with a gun support, of a non-recoil gun mounted thereon, composed of a hollow tube open at both ends and comprising a front barrel and a rear barrel with interrupted screw threads connecting the two, trunnions on the front gun barrel located near the breech end thereof so as to give muzzle preponderance to the front barrel and to permit its breech to swing up when disengaged from the rear barrel, and trunnion bearings therefor on the gun support, and guides on said gun support engaging the rear gun barrel, said guides permitting the rear gun barrel to slide longitudinally and turn axially therein, with means for rotating said gun barrel to unlock the same, and for moving the same axially to clear the breech of the forward gun barrel.

4. In field or siege artillery, the combination with a gun support, of a non-recoil gun mounted thereon, composed of a hollow tube open at both ends and comprising a front barrel and a rear barrel with interrupted screw threads connecting the two, trunnions on the front gun barrel located near the breech end thereof so as to give muzzle preponderance to the front barrel and to permit its breech to swing up when disengaged from the rear barrel, and trunnion bearings therefor on the gun support, and guides on said gun support engaging the rear gun barrel, said guides permitting the rear gun barrel to slide longitudinally and turn axially therein, with means for rotating said rear gun barrel to unlock the same, and for moving the same axially to clear the breech of the forward gun barrel, said means comprising an L-shaped spiral rack secured to the exterior of the rear gun barrel, a worm meshing in said rack, and means for rotating said worm.

5. In field or siege artillery, the combination with a gun support, of a non-recoil gun mounted thereon, composed of a hollow tube open at both ends and comprising a front barrel and a rear barrel with interrupted screw threads connecting the two, trunnions on the front gun barrel, and trunnion bearings therefor on the gun support, and ring-shaped guides on said gun support engaging the rear gun barrel, said guides permitting the rear gun barrel to slide longitudinally and turn axially therein, with means for rotating said rear gun barrel to unlock the same, and for moving the same axially to clear the breech of the forward gun barrel.

6. In field or siege artillery, the combination with a gun support, of a non-recoil gun mounted thereon, composed of a hollow tube open at both ends and comprising a front barrel and a rear barrel with interrupted screw threads connecting the two, trunnions on the front gun barrel, and trunnion bearings therefor on the gun support, and ring-shaped guides on said gun support engaging the rear gun barrel, said guides permitting the rear gun barrel to slide longitudinally and turn axially therein, with means for rotating said rear gun barrel to unlock the same, and for moving the same axially to clear the breech of the forward gun barrel, said means comprising an L-shaped spiral rack secured to the exterior of the rear gun barrel, a worm meshing in said rack, and means for rotating said worm.

7. In field or siege artillery, the combination with a gun support, of a non-recoil gun mounted thereon, composed of a hollow tube open at both ends and comprising a front barrel and a rear barrel with interrupted screw threads connecting the two, trunnions on the front gun barrel located near the breech end thereof so as to give muzzle preponderance to the front barrel and to permit its breech to swing up when disengaged from the rear barrel, and trunnion bearings therefor on the gun support, and ring-shaped guides on said gun support engaging the rear gun barrel, said guides permitting the rear gun barrel to slide longitudinally and turn axially therein, with means for rotating said gun barrel to unlock the same, and for moving the same axially to clear the breech of the forward gun barrel.

8. In field or siege artillery, the combination with a gun support, of a non-recoil gun mounted thereon, composed of a hollow tube open at both ends and comprising a front barrel and a rear barrel with interrupted screw threads connecting the two, trunnions on the front gun barrel located near the breech end thereof so as to give muzzle preponderance to the front barrel and to permit its breech to swing up when disengaged from the rear barrel, and trunnion bearings therefor on the gun support, and ring-shaped guides on said gun support engaging the rear gun barrel, said guides permitting the rear gun barrel to slide longitudinally and turn axially therein, with means for rotating said rear gun barrel to unlock the same, and for moving the same axially to clear the breech of the forward gun barrel, said means comprising an L-shaped spiral rack secured to the exterior of the rear gun barrel, a worm meshing in said rack, and means for rotating said worm.

9. In field or siege artillery, the combination with a gun support, of a non-recoil gun mounted thereon, composed of a hollow tube open at both ends and comprising a front barrel and a rear barrel with interrupted screw threads connecting the two, trunnions on the front gun barrel, and trunnion bearings therefor on the gun support, and guides on said gun support engaging the rear gun barrel, said guides permitting the rear gun barrel to slide longitudinally and turn axially therein, with means for rotating said rear gun barrel to unlock the same, and for moving the same axially to clear the breech of the forward gun barrel, said means comprising an L-shaped spiral rack secured to the exterior of the rear gun barrel, a worm meshing in said rack, and means for rotating said worm, a pin carried by said forward gun barrel near its trunnions, a cam plate engaging said pin, and a rack bar connected to said cam plate and carried by said gun support, said rack bar having spiral teeth engaging said worm, and being reciprocated thereby incident to the operation of opening and closing the breech of the gun.

10. In field or siege artillery, the combination with a gun support, of a non-recoil gun mounted thereon, composed of a hollow tube open at both ends and comprising a front barrel and a rear barrel with interrupted screw threads connecting the two, trunnions on the front gun barrel located near the breech end thereof so as to give muzzle preponderance to the front barrel and to permit its breech to swing up when disengaged from the rear barrel, and trunnion bearings therefor on the gun support, and guides on said gun support engaging the rear gun barrel, said guides permitting the rear gun barrel to slide longitudinally and turn axially therein, with means for rotating said rear gun barrel to unlock the same, and for moving the same axially to clear the breech of the forward gun barrel, said means comprising an L-shaped spiral rack secured to the exterior of the rear gun barrel, a worm meshing in said rack, and means for rotating said worm, a pin carried by said forward gun barrel near its trunnions, a cam plate engaging said pin, and a rack bar connected to said cam plate and carried by said gun support, said rack bar having spiral teeth engaging said worm, and being reciprocated thereby incident to the operation of opening and closing the breech of the gun.

11. In field or siege artillery, the combination with a gun support, of a non-recoil gun mounted thereon, composed of a hollow tube open at both ends and comprising a front barrel and a rear barrel with interrupted screw threads connecting the two, trunnions on the front gun barrel, and trunnion bearings therefor on the gun support, and ring-shaped guides on said gun support engaging the rear gun barrel, said guides permitting the rear gun barrel to slide longitudinally and turn axially therein, with means for rotating said rear gun barrel to unlock the same, and for moving the same axially to clear the breech of the forward gun barrel, said means comprising an L-shaped spiral rack secured to the exterior of the rear gun barrel, a worm meshing in said rack, and means for rotating said worm, a pin carried by said forward gun barrel near its trunnions, a cam plate engaging said pin, and a rack bar connected to said cam plate and carried by said gun support, said rack bar having spiral teeth engaging said worm, and being reciprocated thereby incident to the operation of opening and closing the breech of the gun.

12. In field or siege artillery, the combination with a gun support, of a non-recoil gun mounted thereon, composed of a hollow tube open at both ends and comprising a front barrel and a rear barrel with interrupted screw threads connecting the two, trunnions on the front gun barrel located near the breech end thereof so as to give muzzle preponderance to the front barrel and to permit its breech to swing up when disengaged from the rear barrel, and trunnion bearings therefor on the gun support, and ring-shaped guides on said gun support engaging the rear gun barrel, said guides permitting the rear gun barrel to slide longitudinally and turn axially therein, with means for rotating said rear gun barrel to unlock the same, and for moving the same axially to clear the breech of the forward gun barrel, said means comprising an L-shaped spiral rack secured to the exterior of the rear gun barrel, a worm meshing in said rack, and means for rotating said worm, a pin carried by said forward gun barrel near its trunnions, a cam plate engaging said pin, and a rack bar connected to said cam plate and carried by said gun support, said rack bar having spiral teeth engaging said worm, and being reciprocated thereby incident to the operation of opening and closing the breech of the gun.

13. In field or siege artillery, the combination with a motor truck, of a gun mount carried by said motor truck, and a non-recoil gun carried by said mount, and means for raising and lowering said gun and mount relative to said platform, said means comprising pairs of toggle bars pivoted at one end to the gun mount and having nuts pivoted to their free ends, and reversely-disposed screws journaled on said truck and engaging said nuts, with gearing operable from the driving engine of said truck for turning said screws.

14. In field or siege artillery, the combination with a motor truck, of a gun mount carried by said motor truck, and a non-recoil gun carried by said mount, with means for training said gun and for elevating and depressing same carried by said gun mount, and means for raising and lowering said gun and mount relative to said platform, said means comprising pairs of toggle bars pivoted at one end to the gun mount and having nuts pivoted to their free ends, and reversely-disposed screws journaled on said truck and engaging said nuts, with gearing operable from the driving engine of said truck for turning said screws.

15. In field or siege artillery, the combination with a platform mounted on wheels, of an operating carriage mounted on said platform, an upper carriage pivoted on said operating carriage, a trunnion beam trunnioned on said upper carriage and provided with forwardly and rearwardly projecting arms, the forward arm being provided with a yoke having trunnion seats, and the rear arm being provided with guides, and a non-recoil gun comprising a forward barrel trunnioned in said trunnion seats, and a rear barrel adapted to engage in said guides, with means for connecting said forward and rear barrels together and for disconnecting same.

16. In field or siege artillery, the combination with a platform mounted on wheels, of an operating carriage mounted on said platform, an upper carriage pivoted on said operating carriage, a trunnion beam trunnioned on said upper carriage and provided with forwardly and rearwardly projecting arms, the forward arm being provided with a yoke having trunnion seats, and the rear arm being provided with ring-shaped guides, and a non-recoil gun comprising a forward barrel trunnioned in said trunnion seats, and a rear barrel adapted to slide and to turn in said ring-shaped guides, with means for connecting said forward and rear barrels together and for disconnecting same.

17. In field or siege artillery, the combination with a platform mounted on wheels, of an operating carriage mounted on said platform, means carried by said platform for raising or lowering said operating carriage, an upper carriage pivoted on said operating carriage, a trunnion beam trunnioned on said upper carriage and provided with forwardly and rearwardly projecting arms, the forward arm being provided with a yoke having trunnion seats, and the rear arm being provided with guides, and a non-recoil gun comprising a forward barrel trunnioned in said trunnion seats, and a rear barrel adapted to engage in said guides, with means for connecting said forward and rear barrels together and for disconnecting same.

18. In field or siege artillery, the combination with a platform mounted on wheels, of an operating carriage mounted on said platform, means carried by said platform for raising or lowering said operating carriage, an upper carriage pivoted on said operating carriage, a trunnion beam trunnioned on said upper carriage and provided with forwardly and rearwardly projecting arms, the forward arm being provided with a yoke having trunnion seats, and the rear arm being provided with ring-shaped guides, and a non-recoil gun comprising a forward barrel trunnioned in said trunnion seats, and a rear barrel adapted to slide and to turn in said ring-shaped guides, with means for connecting said forward and rear barrels together and for disconnecting same.

19. In field or siege artillery, the combination with a platform mounted on wheels, of an operating carriage mounted on said platform, means carried by said platform for raising or lowering said operating carriage, said means comprising pairs of toggle bars hinged at their upper ends to said operating carriage, nuts hinged to the lower ends of said toggle bars, and reversely-disposed screws journaled on said platform and engaging said nuts, with means carried by said platform for turning said screws, an upper carriage pivoted on said operating carriage, a trunnion beam trunnioned on said upper carriage and provided with forwardly and rearwardly projecting arms, the forward arm being provided with a yoke having trunnion seats, and the rear arm being provided with guides, and a non-recoil gun comprising a forward barrel trunnioned in said trunnion seats, and a rear barrel adapted to engage in said guides, with means for disconnecting said forward and rear barrels together and for disconnecting same.

20. In field or siege artillery, the combination with a platform mounted on wheels, of an operating carriage mounted on said platform, means carried by said platform for raising or lowering said operating carriage, said means comprising pairs of toggle bars hinged at their upper ends to said operating carriage, nuts hinged to the lower ends of said toggle bars, and reversely-disposed screws journaled on said platform and engaging said nuts, with means carried by said platform for turning said screws, an upper carriage pivoted on said operating carriage, a trunnion beam trunnioned on said upper carriage and provided with forwardly and rearwardly projecting arms, the forward arm being provided with a yoke having trunnion seats, and the rear arm being provided with ring-shaped guides, and a non-recoil gun comprising a forward barrel trunnioned in said trunnion seats, and a rear barrel adapted to slide and to turn in said ring-shaped guides, with means for connecting said forward and rear barrels together and for disconnecting same.

21. In field or siege artillery, the combination with a motor truck, of an operating carriage mounted on said truck, an upper carriage pivoted on said operating carriage, a trunnion beam trunnioned on said upper carriage and provided with forwardly and rearwardly projecting arms, the forward arm being provided with a yoke having trunnion seats, and the rear arm being provided with guides, and a non-recoil gun comprising a forward barrel trunnioned in said trunnion seats, and a rear barrel adapted to engage in said guides, with means for connecting said forward and rear barrels together and for disconnecting same.

22. In field or siege artillery, the combination with a motor truck, of an operating carriage mounted on said truck, an upper carriage pivoted on said operating carriage, a trunnion beam trunnioned on said upper carriage and provided with forwardly and rearwardly projecting arms, the forward arm being provided with a yoke having trunnion seats, and the rear arm being provided with ring-shaped guides, and a non-recoil gun comprising a forward barrel trunnioned in said trunnion seats, and a rear barrel adapted to slide and to turn in said ring-shaped guides, with means for connecting said forward and rear barrels together and for disconnecting same.

23. In field or siege artillery, the combination with a motor truck, of an operating carriage mounted on said truck, means carried by said truck for raising or lowering said operating carriage, an upper carriage pivoted on said operating carriage, a trunnion beam trunnioned on said upper carriage and provided with forwardly and rearwardly projecting arms, the forward arm being provided with a yoke having trunnion seats, and the rear arm being provided with guides, and a non-recoil gun comprising a forward barrel trunnioned in said trunnion seats, and a rear barrel adapted to engage in said guides, with means for connecting said forward and rear barrels together and for disconnecting same.

24. In field or siege artillery, the combination with a motor truck, of an operating carriage mounted on said truck, means carried by said truck for raising or lowering said operating carriage, an upper carriage pivoted on said operating carriage, a trunnion beam trunnioned on said upper carriage and provided with forwardly and rearwardly projecting arms, the forward arm being provided with a yoke having trunnion seats, and the rear arm being provided with ring-shaped guides, and a non-recoil gun comprising a forward barrel trunnioned in said trunnion seats, and a rear barrel adapted to slide and to turn in said ring-shaped guides, with means for connecting said forward and rear barrels together and for disconnecting same.

25. In field or siege artillery, the combination with a motor truck, of an operating carriage mounted on said truck, means carried by said truck for raising or lowering said operating carriage, said means comprising pairs of toggle bars hinged at their upper ends to said operating carriage, nuts hinged to the lower ends of said toggle bars, and reversely-disposed screws journaled on said truck and engaging said nuts, with gearing operable from the driving engine of said truck for turning said screws, an upper carriage pivoted on said operating carriage, a trunnion beam trunnioned on said upper carriage and provided with forwardly and rearwardly projecting arms, the forward arm being provided with a yoke having trunnion seats, and the rear arm being provided with guides, and a non-recoil gun comprising a forward barrel trunnioned in said trunnion seats, and a rear barrel adapted to engage in said guides, with means for connecting said forward and rear barrels together and for disconnecting same.

26. In field or siege artillery, the combination with a motor truck, of an operating carriage mounted on said truck, means carried by said truck for raising or lowering said opeating carriage, said means comprising pairs of toggle bars hinged at their upper ends to said operating carriage, nuts hinged to the lower ends of said toggle bars, and reversely-disposed screws journaled on said truck and engaging said nuts, with gearing operable from the driving engine of said truck for turning said screws, an upper carriage pivoted on said operating carriage, a trunnion beam trunnioned on said upper carriage and provided with forwardly and rearwardly projecting arms, the forward arm being provided with a yoke having trunnion seats, and the rear arm being provided with ring-shaped guides, and a non-recoil gun comprising a forward barrel trunnioned in said trunnion seats, and a rear barrel adapted to slide and to turn in said ring-shaped guides, with means for connecting said forward and rear barrels together and for disconnecting same.

In testimony whereof, I affix my signature.

GREGORY C. DAVISON.